United States Patent
Moriyama et al.

(10) Patent No.: US 11,024,927 B2
(45) Date of Patent: Jun. 1, 2021

(54) ELECTRODE FOR NON-AQUEOUS ELECTROLYTE SECONDARY BATTERY AND NON-AQUEOUS ELECTROLYTE SECONDARY BATTERY

(71) Applicant: SANYO Electric Co., Ltd., Daito (JP)

(72) Inventors: Toshitaka Moriyama, Osaka (JP);
Motoki Kinugawa, Kyoto (JP);
Tomofumi Yanagi, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 69 days.

(21) Appl. No.: 16/343,234

(22) PCT Filed: Oct. 13, 2017

(86) PCT No.: PCT/JP2017/037105
§ 371 (c)(1),
(2) Date: Apr. 18, 2019

(87) PCT Pub. No.: WO2018/079291
PCT Pub. Date: May 3, 2018

(65) Prior Publication Data
US 2019/0252667 A1  Aug. 15, 2019

(30) Foreign Application Priority Data
Oct. 26, 2016 (JP) .............................. JP2016-209406

(51) Int. Cl.
*H01M 4/13* (2010.01)
*H01M 50/538* (2021.01)
(Continued)

(52) U.S. Cl.
CPC ........... *H01M 50/538* (2021.01); *H01M 4/13* (2013.01); *H01M 10/052* (2013.01); *H01M 10/0587* (2013.01); *H01M 4/0404* (2013.01)

(58) Field of Classification Search
CPC ...... H01M 2/263; H01M 10/052; H01M 4/13; H01M 10/0587; H01M 4/0404
See application file for complete search history.

(56) References Cited

U.S. PATENT DOCUMENTS

2006/0093922 A1* 5/2006 Kim ..................... H01M 2/08
429/251

FOREIGN PATENT DOCUMENTS

| JP | 2-92662 U | 7/1990 |
| JP | 4-206341 A | 7/1992 |

(Continued)

OTHER PUBLICATIONS

Machine translation of JP 2012-022792, retrieved from <www.espacenet.com> on Aug. 21, 2020.*

(Continued)

*Primary Examiner* — Cynthia K Walls
(74) *Attorney, Agent, or Firm* — Westerman, Hattori, Daniels & Adrian, LLP

(57) ABSTRACT

An electrode for a non-aqueous electrolyte secondary battery according to one embodiment includes a belt-like current collector, a mixture layer formed on each surface of the current collector, and a lead bonded to an exposed portion of the current collector where the surfaces of the current collector are exposed, the lead extending from one end of the current collector, the one end and another end constituting both ends of the current collector in the width direction. The mixture layer on at least one surface of the current collector is formed in the width direction of the current collector and adjacent to the exposed portion on the other end side, and the length in the width direction of a portion of the lead disposed on the current collector ranges from 60% to 98% of the width of the current collector.

7 Claims, 6 Drawing Sheets

(51) Int. Cl.
*H01M 10/0587* (2010.01)
*H01M 10/052* (2010.01)
*H01M 4/04* (2006.01)

(56) References Cited

FOREIGN PATENT DOCUMENTS

| | | |
|---|---|---|
| JP | 2003-68271 A | 3/2003 |
| JP | 2006-286404 A | 10/2006 |
| JP | 2006-302509 A | 11/2006 |
| JP | 2008-234855 A | 10/2008 |
| JP | 2012-22792 A | 2/2012 |

OTHER PUBLICATIONS

International Search Report dated Dec. 19, 2017, issued in counterpart International Application No. PCT/JP2017/037105 (2 pages).

\* cited by examiner

Figure 2
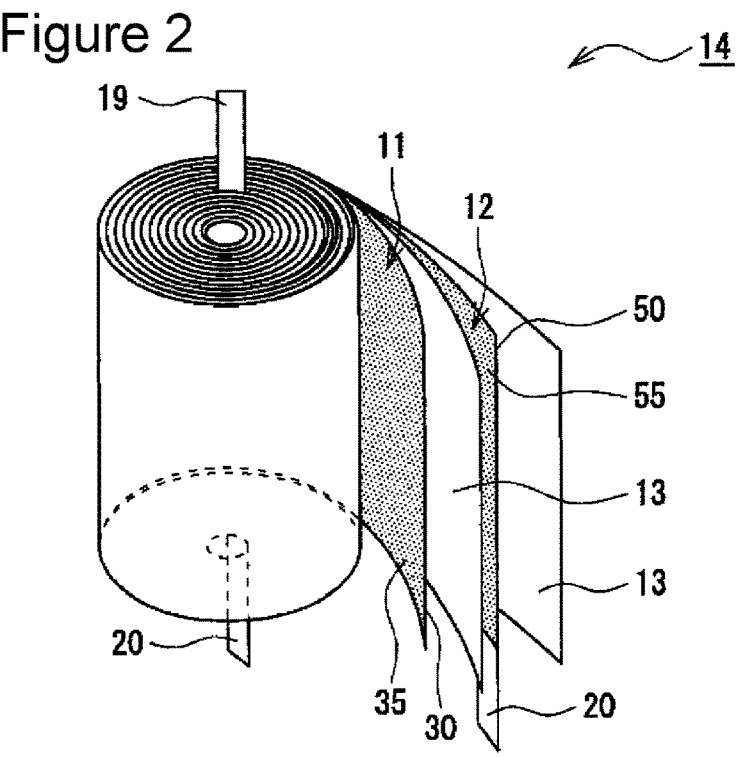
Figure 3
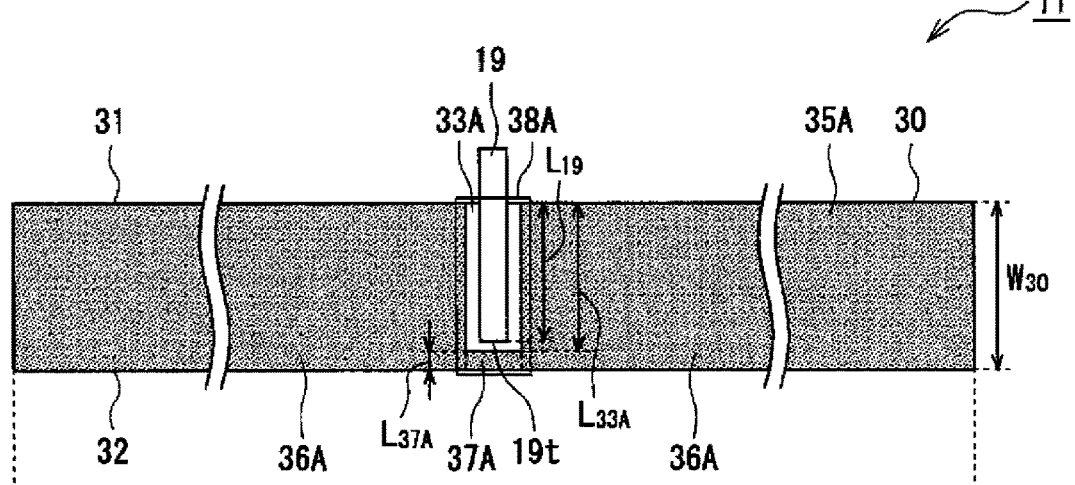
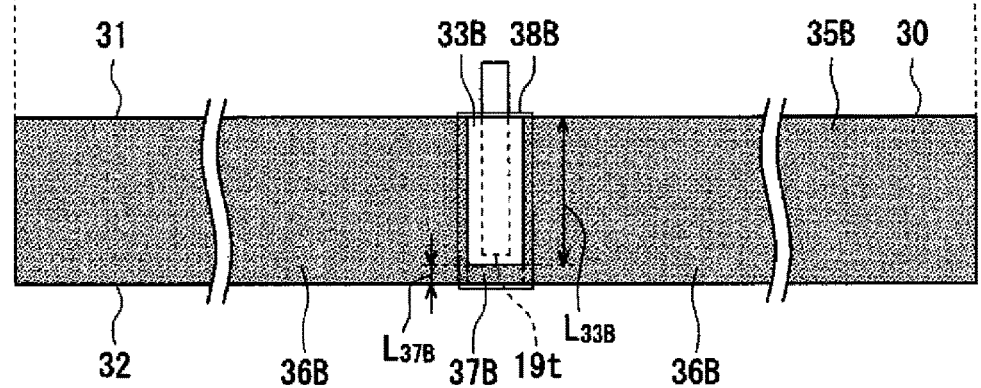

Figure 8
(a)
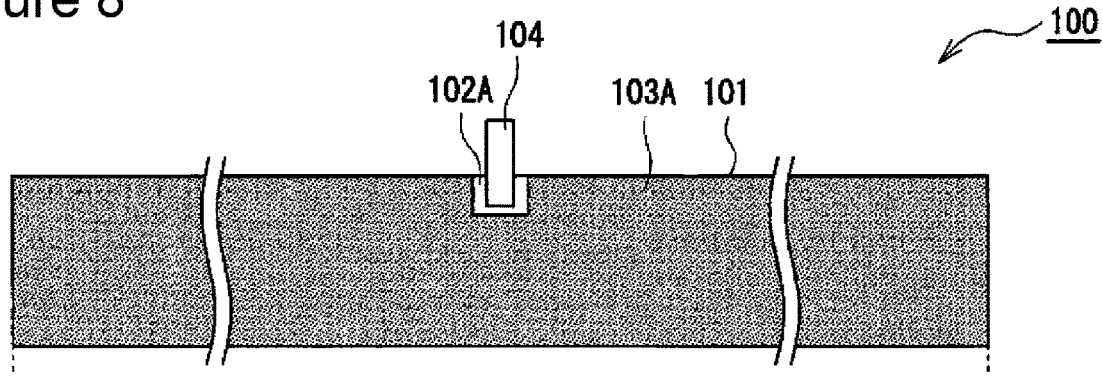
(b)
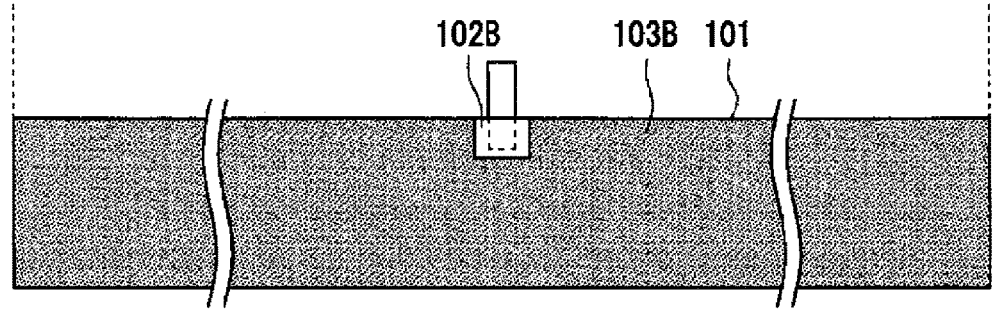

ELECTRODE FOR NON-AQUEOUS ELECTROLYTE SECONDARY BATTERY AND NON-AQUEOUS ELECTROLYTE SECONDARY BATTERY

TECHNICAL FIELD

The present disclosure relates to an electrode for a non-aqueous electrolyte secondary battery and a non-aqueous electrolyte secondary battery.

BACKGROUND ART

Non-aqueous electrolyte secondary batteries include a wound electrode assembly manufactured by winding a positive electrode and a negative electrode with a separator interposed therebetween, for example. In the positive electrode and the negative electrode constituting the wound electrode assembly, typically, a mixture layer is formed on each surface of a belt-like current collector, and a lead is bonded to an exposed portion where the surfaces of the current collector are exposed. In recent years, electrodes with various structures have been proposed to improve the battery performance, such as battery capacity or output. For example, Patent Literature 1 discloses an electrode in which an exposed portion to which a lead is to be bonded is formed on only one end side of a current collector in the width direction to increase the area of a mixture layer and thereby increase battery capacity. Patent Literature 2 discloses an electrode in which an exposed portion is formed over the full width of a current collector.

CITATION LIST

Patent Literature

PTL 1: Japanese Published Unexamined Patent Application No. 2003-68271
PTL 2: Japanese Published Unexamined Patent Application No. 2008-234855

SUMMARY OF INVENTION

Technical Problem

When an exposed portion is formed on only one end side of a current collector in the width direction, a lead is typically unevenly bonded to one end side of the current collector in the width direction. Because the lead has a larger thickness than a mixture layer, in a wound electrode assembly including the electrode disclosed in Patent Literature 1, the electrode assembly bulges locally on one end side in the axial direction due to the large thickness of the lead. Thus, when such an electrode is used, it is difficult to form a stable winding structure outside the lead bonded portion, and winding misalignment of an electrode assembly is likely to occur.

Winding misalignment is reduced when an exposed portion is formed over the full width of a current collector, as in the electrode disclosed in Patent Literature 2, and when a lead is bonded to a current collector so as not to be unevenly bonded to one end side of the current collector in the width direction. In this case, however, an electrically conductive foreign material may easily enter an electrode assembly through a front edge of a lead disposed on a current collector, for example, in a battery manufacturing process, and the foreign material may cause a decrease in open-circuit voltage (OCV) or cause internal short-circuit.

Solution to Problem

An electrode for a non-aqueous electrolyte secondary battery according to one aspect of the present disclosure includes a belt-like current collector, a mixture layer formed on each surface of the current collector, and a lead bonded to an exposed portion of the current collector where the surfaces of the current collector are exposed, the lead extending from one end of the current collector, the one end and another end constituting both ends of the current collector in a width direction, wherein the mixture layer on at least one surface of the current collector is formed in the width direction and adjacent to the exposed portion on the other end side, and the length in the width direction of a portion of the lead disposed on the current collector ranges from 60% to 98% of the width of the current collector.

A non-aqueous electrolyte secondary battery according to one aspect of the present disclosure includes a wound electrode assembly manufactured by winding a positive electrode and a negative electrode with a separator interposed therebetween, wherein at least one of the positive electrode and the negative electrode is constituted by the electrode for a non-aqueous electrolyte secondary battery described above.

Advantageous Effects of Invention

An electrode for a non-aqueous electrolyte secondary battery according to one aspect of the present disclosure can be used to provide a wound electrode assembly in which winding misalignment is sufficiently reduced and with which the decrease in open-circuit voltage (OCV) of the battery is reduced.

BRIEF DESCRIPTION OF DRAWINGS

FIG. 2 is a perspective view of a wound electrode assembly according to one embodiment.
FIG. 3 includes a front view and a rear view of a positive electrode according to one embodiment.
FIG. 7 includes a front view and a rear view of a positive electrode according to another embodiment.
FIG. 8 is a schematic view of a known electrode for a non-aqueous electrolyte secondary battery.

DESCRIPTION OF EMBODIMENTS

Figure 1:
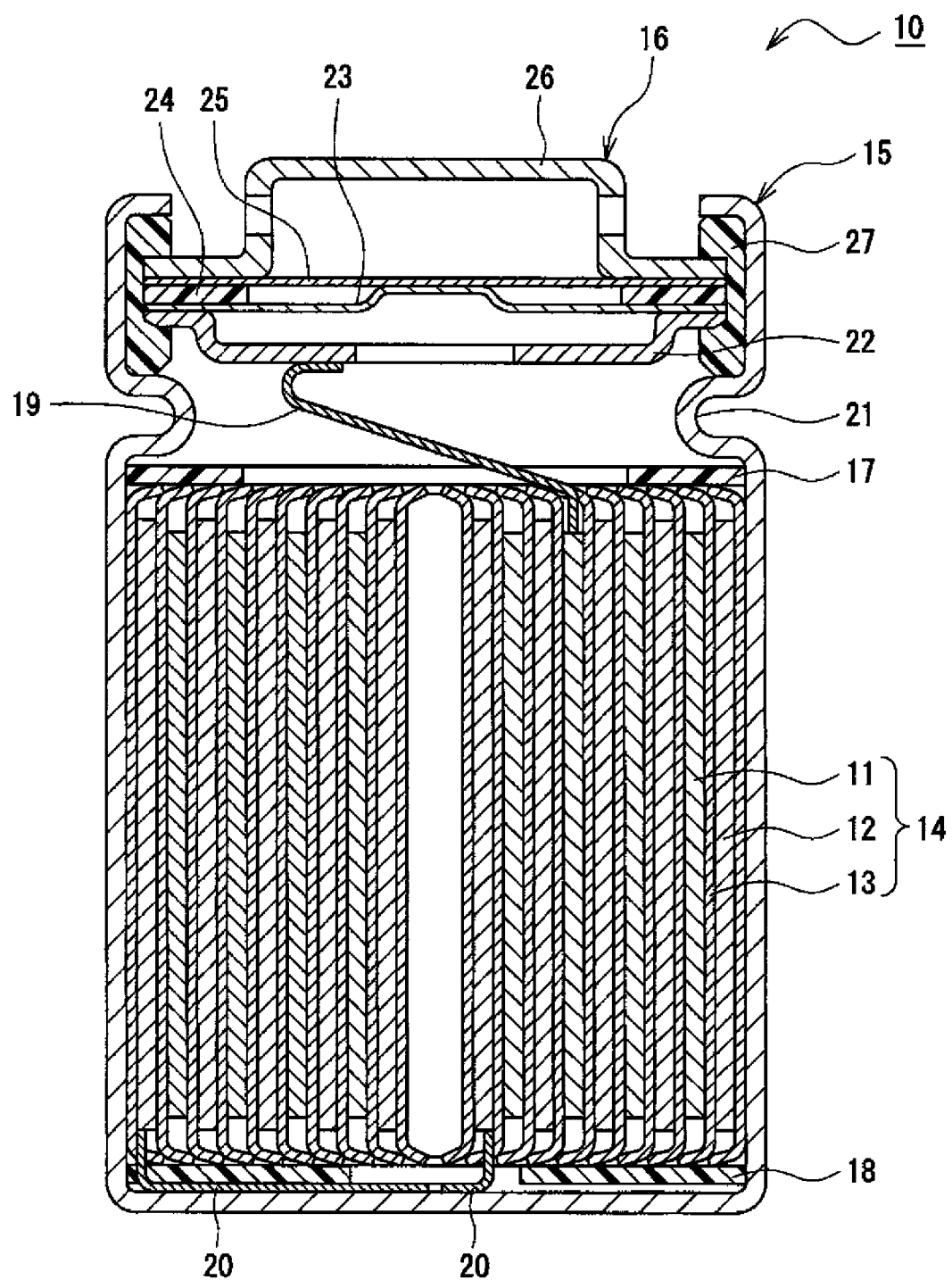
FIG. 1 is a cross-sectional view of a non-aqueous electrolyte secondary battery according to one embodiment.

In an electrode for a non-aqueous electrolyte secondary battery according to one aspect of the present disclosure, winding misalignment of a wound electrode assembly constituted by the electrode is reduced by extending an exposed portion where a surface of a current collector is exposed in the width direction and by adjusting the length of a portion of a lead on the current collector to be 60% or more of the width of the current collector. The lead extends from one end side of the current collector in the width direction. In a known electrode 100 illustrated in FIG. 8, exposed portions 102A and 102B where the surfaces of a current collector are exposed without being covered with mixture layers 103A and 103B are formed on only one end side of a current collector 101 in the width direction, and a lead 104 is unevenly bonded to the current collector 101 on one end side in the width direction. Because a portion to which the lead 104 is bonded has a larger thickness than the other portion in the width direction of the current collector 101, in a wound electrode assembly constituted by the electrode 100, the electrode assembly bulges locally on one end side in the axial direction, which is likely to cause winding misalignment of the electrode assembly. In an electrode for a non-aqueous electrolyte secondary battery according to one aspect of the present disclosure, a lead is disposed on the current collector so as not to be unevenly disposed on one end side of the current collector in the width direction. This reduces winding misalignment of an electrode assembly, which can be problematic when the electrode 100 is used.

In an electrode for a non-aqueous electrolyte secondary battery according to one aspect of the present disclosure, an exposed portion is not formed over the full width of the electrode, but a mixture layer is formed in the width direction and adjacent to the exposed portion on the other end side. The other end is one of both ends of the current collector in the width direction from which a lead is not extended. This can potentially prevent electrically conductive foreign materials from entering the electrode assembly.

Electrically conductive foreign materials that possibly cause the decrease in the OCV of a battery are spatters, for example. Spatters may occur when a lead extending from a wound electrode assembly is welded to a battery case. In a typical wound electrode assembly constituting a cylindrical battery, a positive-electrode lead extends from one side of the electrode assembly in the axial direction, and a negative-electrode lead extends from the other side of the electrode assembly in the axial direction. In this case, although spatters may enter the electrode assembly through a front edge of a lead disposed on a current collector, a mixture layer formed on a portion of an exposed portion adjacent to the other end can potentially prevent the spatters from entering the electrode assembly. In a non-aqueous electrolyte secondary battery including an electrode according to one aspect of the present disclosure, therefore, this can reduce the decrease in open-circuit voltage (OCV) and reduce the occurrence of internal short-circuit caused by electrically conductive foreign materials, such as spatters.

Embodiments of the present disclosure will be described in detail below.

Figures referred in the embodiments are schematically illustrated, and the specific dimensions of each component should be determined in consideration of the following description. The term "almost", as used herein, means to include, for example, in the context of almost the same, substantially the same as well as completely the same. The term "end portion" refers to an end of an object and the vicinity thereof. The term "central portion" refers to the center of an object and the vicinity thereof.

One embodiment is a non-aqueous electrolyte secondary battery 10, which is a cylindrical battery including a cylindrical metallic case. However, a non-aqueous electrolyte secondary battery according to the present disclosure is not limited to this. A non-aqueous electrolyte secondary battery according to the present disclosure may be a prismatic battery including a prismatic metallic case or a laminated battery including a resin sheet exterior, for example.

FIG. 1 is a cross-sectional view of the non-aqueous electrolyte secondary battery 10. FIG. 2 is a perspective view of an electrode assembly 14 constituting the non-aqueous electrolyte secondary battery 10. As illustrated in FIGS. 1 and 2, the non-aqueous electrolyte secondary battery 10 includes a wound electrode assembly 14 and a non-aqueous electrolyte (not shown). The electrode assembly 14 includes a positive electrode 11, a negative electrode 12, and a separator 13. The positive electrode 11 and the negative electrode 12 are wound with the separator 13 interposed therebetween. The non-aqueous electrolyte contains a non-aqueous solvent and an electrolyte salt dissolved in the non-aqueous solvent. The non-aqueous electrolyte is not limited to a liquid electrolyte and may be a solid electrolyte containing a gel polymer. One side of the electrode assembly 14 in the axial direction is hereinafter sometimes referred to as "upper", and the other side in the axial direction is sometimes referred to as "lower".

The positive electrode 11 includes a belt-like positive-electrode current collector 30, a positive-electrode mixture layer 35 formed on the positive-electrode current collector 30, and a positive-electrode lead 19. The positive-electrode lead 19 is an electrically conductive member for electrically connecting the positive-electrode current collector 30 to a positive-electrode terminal and extends from an upper end of an electrode group. The electrode group refers to the electrode assembly 14 except leads. In the present embodiment, the positive-electrode lead 19 is disposed almost midway between the winding start portion and the winding end portion of the electrode assembly 14.

The negative electrode 12 includes a belt-like negative-electrode current collector 50, a negative-electrode mixture layer 55 formed on the negative-electrode current collector 50, and a negative-electrode lead 20. The negative-electrode lead 20 is an electrically conductive member for electrically connecting the negative-electrode current collector 50 to a negative-electrode terminal and extends from a lower end of the electrode group. In the present embodiment, the negative-electrode lead 20 is disposed on the winding start portion of the electrode assembly 14 and on winding end portion of the electrode assembly 14.

The positive-electrode lead 19 and the negative-electrode lead 20 are belt-like electrically conductive members with a larger thickness than the current collector and the mixture layer. The thickness of each lead is 3 to 30 times the thickness of the current collector, for example, and typically ranges from 50 to 300 µm. Although the constituent material of each lead is not particularly limited, the positive-electrode lead 19 is preferably composed of an aluminum-based metal, and the negative-electrode lead 20 is preferably composed of a nickel- or copper-based metal. The number and position of leads are not particularly limited. For example, the negative-electrode lead 20 may be disposed on only the winding start portion or the winding end portion of the electrode assembly 14.

In the embodiment illustrated in FIG. 1, a case main body 15 and a seal 16 constitute a metallic battery case that contains the electrode assembly 14 and the non-aqueous electrolyte. Insulating plates 17 and 18 are disposed on the top and bottom of the electrode assembly 14. The positive-electrode lead 19 extends to the seal 16 through a through-hole of the insulating plate 17 and is welded to the bottom of a filter 22, which is a bottom plate of the seal 16. In the non-aqueous electrolyte secondary battery 10, a cap 26, which is a top plate of the seal 16 electrically connected to the filter 22, serves as a positive-electrode terminal. The negative-electrode leads 20 extend to the bottom of the case main body 15 and are welded to the bottom inner surface of the case main body 15. In the non-aqueous electrolyte secondary battery 10, the case main body 15 serves as a negative-electrode terminal.

As described above, the electrode assembly 14 has a winding structure in which the positive electrode 11 and the negative electrode 12 are wound with the separator 13 interposed therebetween. The positive electrode 11, the negative electrode 12, and the separator 13 are belt-like and are wound to be stacked in the radial direction of the electrode assembly 14. In the electrode assembly 14, the longitudinal direction of each electrode is the winding direction (the circumferential direction), and the width direction of each electrode is the axial direction.

The case main body 15 is a closed-end cylindrical metallic container. A gasket 27 is disposed between the case main body 15 and the seal 16 and ensures the sealing performance of the battery case. The case main body 15 has a protrusion 21 for supporting the seal 16. The protrusion 21 is formed by pressing the side surface of the case main body 15 from the outside, for example. The protrusion 21 is preferably formed circularly along the circumferential direction of the case main body 15 and supports the seal 16 on the top surface thereof.

The seal 16 has a layered structure of the filter 22, a lower valve body 23, an insulating member 24, an upper valve body 25, and the cap 26 stacked over the electrode assembly 14 in this order. Each member of the seal 16 is discoidal or ring-shaped, for example, and each member except the insulating member 24 is electrically connected to each other. The lower valve body 23 and the upper valve body 25 are connected to each other at their central portions. The insulating member 24 is disposed between the peripheries of the lower valve body 23 and the upper valve body 25. If abnormal heat generation increases the internal pressure of the battery, the upper valve body 25 expands toward the cap 26 and separates from the lower valve body 23, thereby breaking the electrical connection between the upper valve body 25 and the lower valve body 23. A further increase in internal pressure results in the rupture of the upper valve body 25 and causes a gas to be discharged from an opening in the cap 26.

The structure of the positive electrode 11 will be described in detail below with reference to FIG. 3. FIG. 3 includes a front view and a rear view of the positive electrode 11.

As illustrated in FIG. 3, the positive electrode 11 includes the belt-like positive-electrode current collector 30 and the positive-electrode mixture layer 35 formed on each surface of the positive-electrode current collector 30 (see FIG. 2). The positive-electrode mixture layers 35 include a positive-electrode mixture layer 35A formed on a first surface of the positive-electrode current collector 30 and a positive-electrode mixture layer 35B formed on a second surface of the positive-electrode current collector 30. The positive-electrode mixture layers 35A and 35B have almost the same pattern. In the present specification, the first surface of the current collector refers to a surface to which a lead is bonded, and the second surface refers to a surface to which no lead is bonded.

The positive electrode 11 has an exposed portion where both surfaces of the positive-electrode current collector 30 are exposed. The exposed portion includes an exposed portion 33A disposed on the first surface of the positive-electrode current collector 30 and an exposed portion 33B disposed on the second surface of the positive-electrode current collector 30. The positive electrode 11 further includes the positive-electrode lead 19, which is bonded to one of the exposed portions 33A and 33B and extends from one end 31 of the positive-electrode current collector 30 in the width direction. In the embodiment illustrated in FIG. 3, the positive-electrode lead 19 is bonded to the exposed portion 33A on the first surface of the positive-electrode current collector 30. The exposed portion 33A enables the positive-electrode lead 19 to be directly connected to the positive-electrode current collector 30. Although the details are described later, the length of a portion of the positive-electrode lead 19 disposed on the positive-electrode current collector 30 in the width direction of the current collector ranges from 60% to 98% of the width of the positive-electrode current collector 30.

The positive-electrode current collector 30 is a long electrically conductive member with an almost constant width. The positive-electrode current collector 30 may be made of a sheet of a metal, such as aluminum, or a film including the metal as a surface layer. A suitable example of the positive-electrode current collector 30 is made of a metal sheet composed mainly of aluminum or an aluminum alloy. The positive-electrode current collector 30 has a thickness in the range of 5 to 30 μm, for example. The exposed portions 33A and 33B where the surfaces of the positive-electrode current collector 30 are exposed extend from one end 31 of the positive-electrode current collector 30 in the width direction and are rectangular in the front and rear views. The positive-electrode mixture layers 35A and 35B are preferably almost entirely formed on each surface of the positive-electrode current collector 30 except the exposed portions 33A and 33B. The positive-electrode mixture layers 35A and 35B contain a positive-electrode active material, an electrically conductive agent, and a binder, for example. The positive electrode 11 can be manufactured by applying a positive-electrode mixture slurry, which contains a positive-electrode active material, an electrically conductive agent, such as a carbon powder, a binder, such as a fluoropolymer powder, and a solvent, such as N-methyl-2-pyrrolidone (NMP), to the surfaces of the positive-electrode current collector 30 and by pressing the film. The positive-electrode mixture layers 35A and 35B have a thickness in the range of 50 to 100 μm, for example.

The positive-electrode active material may be a lithium-containing transition metal oxide containing at least one transition metal element, such as Co, Mn, and/or Ni. The lithium-containing transition metal oxide is preferably, but not limited to, a composite oxide represented by the general formula $Li_{1+x}MO_2$ (wherein $-0.2 < x \leq 0.2$, and M contains at least one of Ni, Co, Mn, and Al). The constituents of a first region and a second region of the positive-electrode mixture layers 35A and 35B described later may be almost the same or different from each other. For example, the constituent ratio may be different between the first region and the second region.

The exposed portion 33A is a portion to which the positive-electrode lead 19 is to be bonded and is a portion of the first surface of the positive-electrode current collector 30 where the first surface is exposed without being covered with the positive-electrode mixture layer 35A. The exposed portion 33B is a portion of the second surface of the positive-electrode current collector 30 where the second surface is exposed without being covered with the positive-electrode mixture layer 35B. The exposed portion 33B overlaps the exposed portion 33A in the thickness direction of the positive electrode 11 (the positive-electrode current collector 30). If the exposed portion 33A overlaps the positive-electrode mixture layer 35B, for example, welding of the positive-electrode lead 19 to the exposed portion 33A may be inhibited. Thus, the exposed portion 33B is disposed opposite the exposed portion 33A. The overlap between the exposed portions 33A and 33B preferably includes at least the region of the positive-electrode lead 19 on the positive-electrode current collector 30.

Although the exposed portions 33A and 33B may be formed by forming the positive-electrode mixture layers 35A and 35B on the entire surfaces of the positive-electrode current collector 30 and subsequently removing part of the mixture layers, the exposed portions 33A and 33B are preferably formed by intermittent application of the positive-electrode mixture slurry, as described in detail later. This can eliminate the mixture layer removal process and reduce the material cost.

Although the exposed portions 33A and 33B may be formed in an end portion of the positive electrode 11 in the longitudinal direction, the exposed portions 33A and 33B are preferably formed in the central portion of the positive electrode 11 in the longitudinal direction. For example, the exposed portions 33A and 33B are disposed at almost equal distances from each end of the positive electrode 11 in the longitudinal direction. In this case, because the positive-electrode lead 19 is bonded in the central portion of the positive-electrode current collector 30 in the longitudinal direction, the positive electrode 11 has improved current collecting performance compared with the case where the positive-electrode lead 19 is bonded in an end portion in the longitudinal direction, thus contributing to increasing the power of the battery. The first surface of the positive-electrode current collector 30 may have a plurality of exposed portions, and a plurality of leads may be welded on the first surface.

In the positive electrode 11, the positive-electrode mixture layer is formed on at least one surface of the positive-electrode current collector 30 in the width direction of the positive-electrode current collector 30 and adjacent to the exposed portion on the other end 32 side. The mixture layer formed adjacent to the exposed portion on the other end 32 side can decrease the lower end space of the electrode assembly 14 made by welding of the positive-electrode lead 19, for example, and can potentially prevent electrically conductive foreign materials from entering the electrode assembly 14.

In the present embodiment, the positive-electrode mixture layer 35A is formed on the first surface of the positive-electrode current collector 30 between the other end 32 of the positive-electrode current collector 30 and an end 19t of the positive-electrode lead 19. The positive-electrode mixture layer 35B is also formed on the second surface of the positive-electrode current collector 30 between the other end 32 of the positive-electrode current collector 30 and the position corresponding to the end 19t of the positive-electrode lead 19. Thus, the positive-electrode mixture layers 35A and 35B are formed along the exposed portions 33A and 33B, respectively, on the surfaces of the positive-electrode current collector 30 in the width direction of the current collector. The position corresponding to the end 19t of the positive-electrode lead 19 refers to the position overlapping the end 19t on the second surface of the positive-electrode current collector 30 in the thickness direction of the positive electrode 11.

In the present specification, the portions of the positive-electrode mixture layers 35A and 35B adjacent to the exposed portions 33A and 33B, respectively, in the width direction of the positive-electrode current collector 30 are referred to as second regions 37A and 37B. The portion adjacent to the exposed portion 33A and the second region 37A is referred to as a first region 36A of the positive-electrode mixture layer 35A, and the portion adjacent to the exposed portion 33B and the second region 37B is referred to as a first region 36B of the positive-electrode mixture layer 35B.

The exposed portion 33A to which the positive-electrode lead 19 is to be welded is adjacent to the first region 36A in the longitudinal direction of the positive-electrode current collector 30, and three sides of the exposed portion 33A except one end 31 are surrounded by the first region 36A and the second region 37A. The second region 37A may be separated from the first region 36A formed on both sides of the exposed portion 33A in the width direction but is preferably in contact with the first region 36A. The exposed portion 33B and the second region 37B have basically the same pattern as the exposed portion 33A and the second region 37A, respectively. In the present embodiment, the positive-electrode mixture layers 35A and 35B are continuously formed on the end portions on the other end 32 side on both surfaces of the positive-electrode current collector 30 over the entire length of the positive-electrode current collector 30.

As described above, the length $L_{19}$ of the portion of the positive-electrode lead 19 disposed on the positive-electrode current collector 30 in the width direction of the current collector ranges from 60% to 98%, preferably 80% to 98%, particularly preferably 80% to 95%, of the width $W_{30}$ of the positive-electrode current collector 30. The length $L_{19}$ in this range results in suppression of winding misalignment of the electrode assembly 14 resulting from the large thickness of the positive-electrode lead 19.

In the second regions 37A and 37B, the lengths $L_{37A}$ and $L_{37B}$ in the width direction of the positive-electrode current collector 30 preferably range from 0.1% to 40% of the width $W_{30}$ of the current collector. The second regions 37A and 37B preferably do not overlap the positive-electrode lead 19 in the thickness direction of the positive-electrode current collector 30. In other words, the second regions 37A and 37B are preferably formed only between the end 19t of the positive-electrode lead 19 or the position corresponding to the end 19t and the other end 32 of the positive-electrode current collector 30. For example, when the length $L_{19}$ of the positive-electrode lead 19 ranges from 80% to 98% of the width $W_{30}$, the lengths $L_{37A}$ and $L_{37B}$ range from 0.1% to 20% of the width $W_{30}$, that is, approximately 0.5 to 5 mm.

In the present embodiment, there is a space between the second region 37A and the end 19t of the positive-electrode lead 19. The positive-electrode lead 19 is not disposed over the entire length of the exposed portion 33A, and the length $L_{19}$ of the positive-electrode lead 19 is 60% or more of the width $W_{30}$ of the positive-electrode current collector 30 and is the length at which the positive-electrode lead 19 is not in contact with the second region 37A. Thus, the lengths $L_{33A}$ and $L_{33B}$ of the exposed portions 33A and 33B in the width direction of the positive-electrode current collector 30 are longer than the length $L_{19}$. The lengths $L_{33A}$ and $L_{33B}$ may range from 1.05 to 1.5 times the length $L_{19}$, for example. The lengths $L_{33B}$ and $L_{37B}$ are almost the same as the lengths $L_{33A}$ and $L_{37A}$. The widths of the exposed portions 33A and 33B (the lengths in the longitudinal direction of the positive-electrode current collector 30) are preferably close to the width of the positive-electrode lead 19, for example, slightly longer than the width of the positive-electrode lead 19, provided that the positive-electrode lead 19 can be bonded to the exposed portion 33A without any trouble.

Although the second regions 37A and 37B are formed to cover the other end 32 of the positive-electrode current collector 30, there may be an exposed portion where the surfaces of the current collector are exposed between the second regions 37A and 37B and the other end 32. The second regions 37A and 37B have a thickness in the range of 50 to 100 μm, for example, which is almost the same as the thickness of the first regions 36A and 36B. Alternatively, the second regions 37A and 37B may have a smaller thickness than the first regions 36A and 36B.

In the positive electrode 11, the exposed portions 33A and 33B are covered with insulating tapes 38A and 38B. The insulating tape 38A covers not only the positive-electrode lead 19 but also the first region 36A and the second region 37A. In the embodiment illustrated in FIG. 3, the exposed portion 33A and the second region 37A are entirely covered with the insulating tape 38A. The insulating tape 38B has almost the same size as the insulating tape 38A and entirely covers the exposed portion 33B and the second region 37B. The insulating tapes 38A and 38B have a thickness in the range of 20 to 70 μm, for example.

Figure 4:
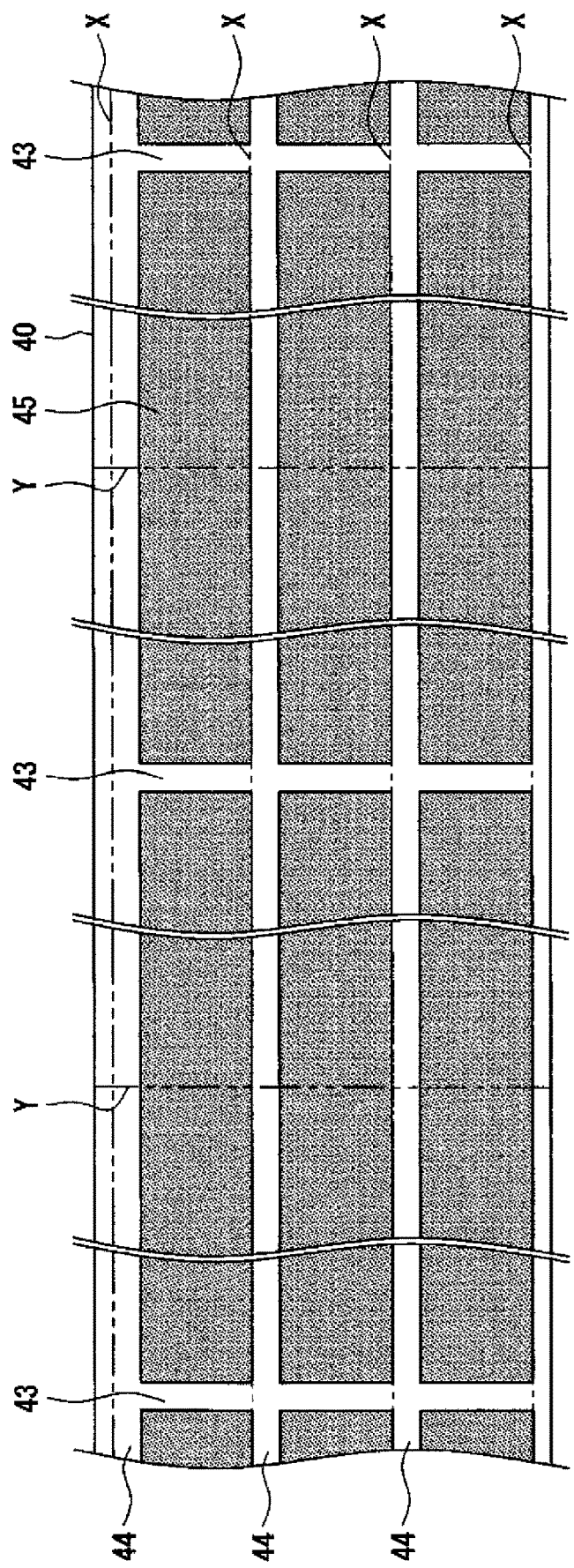
FIG. 4 is an explanatory view of a method for manufacturing a positive electrode according to one embodiment.
Figure 5:
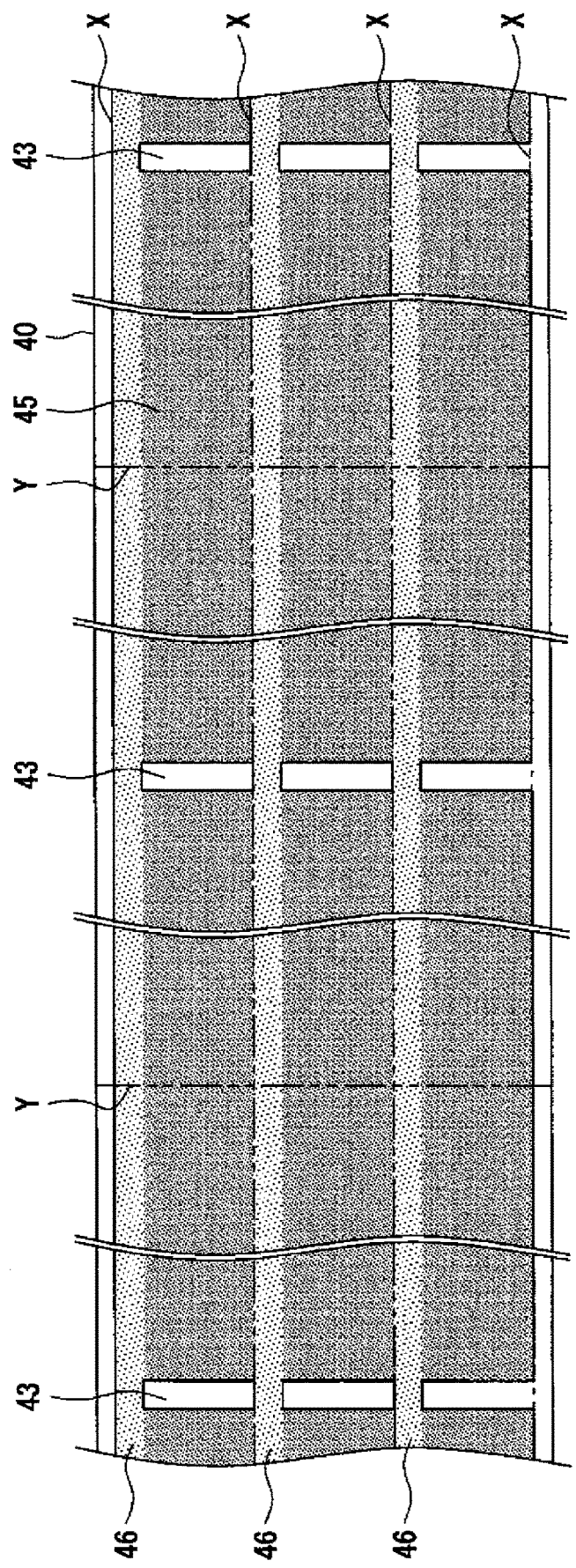
FIG. 5 is an explanatory view of a method for manufacturing a positive electrode according to one embodiment.

A method for manufacturing the positive electrode 11 with the above structure will be described below with reference to FIGS. 4 and 5. In FIG. 5, for convenience of explanation, positive-electrode mixture layers 45 and 46 are illustrated in different dot densities. As illustrated in FIGS. 4 and 5, the positive electrode 11 is manufactured by sequentially forming the positive-electrode mixture layers 45 and 46 on a long current collector 40 and cutting the long current collector 40 at cutting positions X and Y. The positive-electrode mixture layers 45 and 46 formed on both surfaces of the long current collector 40 serve as the positive-electrode mixture layers 35A and 35B, and the long current collector 40 is cut at the cutting positions X and Y and serves as the positive-electrode current collector 30.

In the embodiment illustrated in FIGS. 4 and 5, the positive-electrode mixture slurry is intermittently applied to both surfaces of the long current collector 40 except exposed portions 43 and 44 where the current collector surfaces are exposed, thereby forming the positive-electrode mixture layer 45. The positive-electrode mixture slurry is then applied to the exposed portion 44 to form the positive-electrode mixture layer 46. The exposed portions 43 extend in the width direction of the long current collector 40 and are disposed at almost regular intervals in the longitudinal direction of the current collector. The exposed portions 44 are formed almost perpendicular to the exposed portions 43 in the longitudinal direction of the long current collector 40. The positive-electrode mixture slurry is applied to the exposed portions 44 to form the positive-electrode mixture layer 46, thereby forming the positive-electrode mixture layer serving as the first regions 36A and 36B and the second regions 37A and 37B while leaving exposed portions serving as the exposed portions 33A and 33B.

The positive electrode 11 is manufactured, for example, by pressing the films of the positive-electrode mixture layers 45 and 46 and cutting the long current collector 40, on which the mixture layers are formed, at the cutting positions X and Y. In the formation of the positive-electrode mixture layers 45 and 46, the constituents and thicknesses of the first regions 36A and 36B and the second regions 37A and 37B are almost equalized by applying the same positive-electrode mixture slurry at the same thickness. The exposed portion 43 has a width in the range of approximately 5 to 10 mm, for example, which is wider than the width of the positive-electrode lead 19. The exposed portion 44 has a width in the range of approximately 0.5 to 5 mm, for example, depending on the length of the second regions 37A and 37B (the exposed portions 33A and 33B) in the width direction of the current collector.

Figure 6:
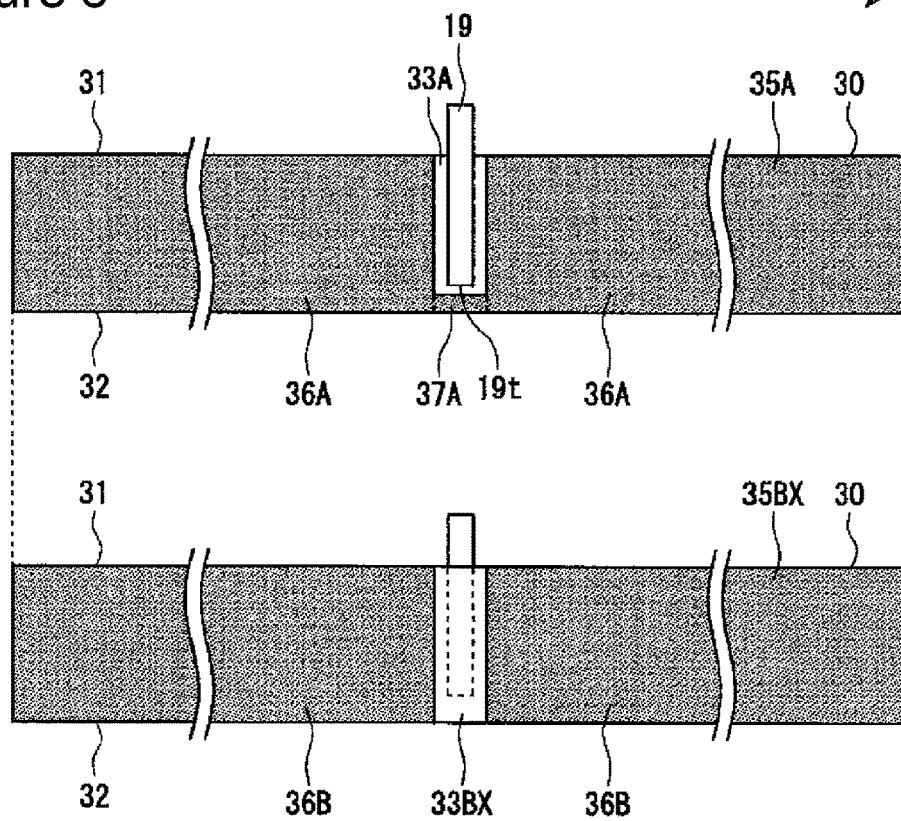
FIG. 6 includes a front view and a rear view of a positive electrode according to another embodiment.

FIGS. 6 and 7 illustrate positive electrodes 11X and 11Y according to another embodiment (insulating tapes are not shown). The positive electrode 11X illustrated in FIG. 6 is different from the positive electrode 11 in that the second region 37B is not formed on the second surface of the positive-electrode current collector 30. Thus, in the positive electrode 11X, the second region 37A of the positive-electrode mixture layer 35A adjacent to the exposed portion 33A in the width direction of the current collector is formed only in an end portion on the other end 32 side of the first surface of the positive-electrode current collector 30 to which the positive-electrode lead 19 is bonded. The positive-electrode mixture layer 35BX does not have the second region 37B, and the exposed portion 33BX is formed over the full width of the positive-electrode current collector 30.

The positive electrode 11Y illustrated in FIG. 7 is different from the positive electrode 11 in that the second region 37A is not formed on the first surface of the positive-electrode current collector 30. Thus, in the positive electrode 11Y, the second region 37B of the positive-electrode mixture layer 35B adjacent to the exposed portion 33B in the width direction of the current collector is formed only in an end portion on the other end 32 side of the second surface of the positive-electrode current collector 30 to which the positive-electrode lead 19 is not bonded. The positive-electrode mixture layer 35AY does not have the second region 37A, and the exposed portion 33AY is formed over the full width of the positive-electrode current collector 30.

Like the positive electrode 11, the negative electrode 12 includes the belt-like negative-electrode current collector 50 and the negative-electrode mixture layer 55 formed on both surfaces of the negative-electrode current collector 50 (see FIG. 2). The negative-electrode current collector 50 may be made of a sheet of a metal, such as copper, or a film including the metal as a surface layer. A negative-electrode active material in the negative-electrode mixture layer 55 may be any material that can reversibly adsorb and desorb lithium ions and is preferably a carbon material, such as graphite, a metal that can be alloyed with lithium, such as Si or Sn, or an alloy thereof, an oxide, or the like. The negative-electrode mixture layer 55 may contain carboxymethylcellulose (CMC) or styrene-butadiene rubber (SBR) as a binder, for example.

The negative electrode 12 includes the negative-electrode lead 20 that is bonded to one of exposed portions (not shown) where part of each surface of the negative-electrode current collector 50 is exposed and that extends from one end of the negative-electrode current collector 50 in the width direction (in the present embodiment, the lower side of the electrode assembly 14). The negative electrode 12 is larger than the positive electrode 11 and has an exposed portion at both ends in the longitudinal direction. The negative-electrode lead 20 is welded to each exposed portion, for example.

The negative electrode 12 can also have basically the same structure as the positive electrode 11. The length of a portion of the negative-electrode lead 20 on the negative-electrode current collector 50 in the width direction of the negative-electrode current collector 50 ranges from 60% to 98% of the width of the negative-electrode current collector 50, for example. In at least one surface of the negative-electrode current collector 50, the negative-electrode mixture layer 55 may be formed in the width direction of the current collector and adjacent to the other end side of the exposed portion (in the present embodiment, the upper side of the electrode assembly 14).

EXAMPLES

Although the present disclosure will be further described in the following examples, the present disclosure is not limited to these examples.

Example 1

[Preparation of Positive Electrode]

Lithium cobalt oxide, a carbon powder, and a fluoropolymer powder were mixed at a weight ratio of 100:1:1. A proper amount of N-methyl-2-pyrrolidone was added to the mixture to prepare a positive-electrode mixture slurry. The positive-electrode mixture slurry was then intermittently applied to both surfaces of a long current collector made of aluminum foil 15 μm in thickness, and the film was pressed with a rolling mill to an electrode plate thickness of 140 μm to form a positive-electrode mixture layer. The long current collector that had the positive-electrode mixture layer on each surface was cut in a predetermined electrode size, and a positive-electrode lead was welded to an exposed portion on one surface (first surface) of the current collector to prepare a positive electrode.

The positive-electrode lead was an aluminum lead 4 mm in width, 67 mm in length, and 150 μm in thickness. The length of a portion of the positive-electrode lead disposed on the positive-electrode current collector was 53.1 mm, which corresponds to 90% of the width of the current collector (59 mm).

The slurry was applied twice to each surface of the long current collector, four times in total, to form the positive-electrode mixture layer, as illustrated in FIGS. 4 and 5. In the first application step, the positive-electrode mixture slurry was intermittently applied to one surface (first surface) of the long current collector except the exposed portion 43 with a width of 7 mm extending in the width direction of the current collector and except the exposed portion 44 with a width of 1 mm extending in the longitudinal direction of the current collector, thereby forming the positive-electrode mixture layer 45 with a width of 58 mm. In the second application step, the positive-electrode mixture slurry was continuously applied to the exposed portion 44 extending in the longitudinal direction of the current collector to form the positive-electrode mixture layer 46 with a width of 1 mm. The slurry was applied to the other surface (second surface) of the long current collector in the same manner as in the first surface to form the positive-electrode mixture layers 45 and 46, which overlapped the mixture layer on the first surface in the thickness direction of the electrode plate.

The exposed portion in the resulting positive electrode had a length of 58 mm in the width direction of the current collector, and the second region of the positive-electrode mixture layer formed adjacent to the exposed portion in the width direction of the current collector had a length of 1 mm (approximately 1.7% of the width of the current collector) in the width direction. In the positive electrode, the exposed portions and the second regions were entirely covered with a polyimide insulating tape 12 mm in width, 63 mm in length, and 50 μm in thickness.

[Preparation of Negative Electrode]

A natural graphite powder, carboxymethylcellulose (CMC), and styrene-butadiene rubber (SBR) were mixed at a weight ratio of 100:1:1. A proper amount of water was added to the mixture to prepare a negative-electrode mixture slurry. The negative-electrode mixture slurry was then intermittently applied to both surfaces of a long current collector made of copper foil, and the film was pressed with a rolling mill to an electrode plate thickness of 160 μm to form a negative-electrode mixture layer. The long current collector that had the negative-electrode mixture layer on each surface was cut in a predetermined electrode size, and a negative-electrode lead was welded to an exposed portion to prepare a negative electrode. The exposed portion was formed at both ends of the negative electrode in the longitudinal direction, and the negative-electrode lead was welded to each exposed portion. The exposed portion was covered with the polyimide insulating tape.

[Preparation of Non-Aqueous Electrolyte]

Ethylene carbonate (EC) and ethyl methyl carbonate (EMC) were mixed at a volume ratio of 30:70. Lithium hexafluorophosphate ($LiPF_6$) was dissolved in the mixed solvent at a concentration of 1 mol/L to prepare a non-aqueous electrolyte.

[Manufacture of Battery]

The positive electrode and the negative electrode were wound with a polyethylene separator interposed therebetween to prepare a wound electrode assembly. The electrode assembly was placed in a closed-end cylindrical metallic case main body. An upper end of the positive-electrode lead was welded to a bottom plate of a seal, and a lower end of the negative-electrode lead was welded to a bottom inner surface of the case main body. The non-aqueous electrolyte was poured into the case main body, and the opening of the case main body was hermetically sealed with a seal with a polypropylene gasket interposed therebetween, thus manufacturing a cylindrical battery. An insulating plate was disposed on the top and bottom of the electrode group.

Example 2

The positive-electrode lead was an aluminum lead 4 mm in width, 71.7 mm in length, and 150 μm in thickness. The length of a portion of the positive-electrode lead disposed on the positive-electrode current collector was 57.8 mm, which corresponds to 98% of the width of the current collector (59 mm). Except for these, a cylindrical battery was manufactured in the same manner as in Example 1.

Example 3

The positive-electrode lead was an aluminum lead 4 mm in width, 49.3 mm in length, and 150 μm in thickness. The length of a portion of the positive-electrode lead disposed on the positive-electrode current collector was 35.4 mm, which corresponds to 60% of the width of the current collector (59 mm). Except for these, a cylindrical battery was manufactured in the same manner as in Example 1.

Example 4

The positive-electrode mixture slurry was intermittently applied to the second surface of the long current collector except the exposed portion 43 with a width of 7 mm extending in the width direction of the current collector, thereby forming a positive-electrode mixture layer 59 mm in width. Except for this, a cylindrical battery was manufactured in the same manner as in Example 1. The positive electrode in Example 4 is different from the positive electrode in Example 1 in that the second region of the positive-electrode mixture layer is not formed on the second surface of the positive-electrode current collector (see FIG. 6).

Example 5

The positive-electrode lead was an aluminum lead 4 mm in width, 71.7 mm in length, and 150 μm in thickness. The length of a portion of the positive-electrode lead disposed on the positive-electrode current collector was 57.8 mm, which corresponds to 98% of the width of the current collector (59 mm). Except for these, a cylindrical battery was manufactured in the same manner as in Example 4.

Example 6

The positive-electrode lead was an aluminum lead 4 mm in width, 49.3 mm in length, and 150 μm in thickness. The length of a portion of the positive-electrode lead disposed on the positive-electrode current collector was 35.4 mm, which corresponds to 60% of the width of the current collector (59 mm). Except for these, a cylindrical battery was manufactured in the same manner as in Example 4.

Example 7

The positive-electrode mixture slurry was intermittently applied to the first surface of the long current collector except the exposed portion 43 with a width of 7 mm extending in the width direction of the current collector, thereby forming a positive-electrode mixture layer 59 mm in width. Except for this, a cylindrical battery was manufactured in the same manner as in Example 1. The positive electrode in Example 7 is different from the positive electrode in Example 1 in that the second region of the positive-electrode mixture layer is not formed on the first surface of the positive-electrode current collector (see FIG. 7).

Example 8

The positive-electrode lead was an aluminum lead 4 mm in width, 71.7 mm in length, and 150 μm in thickness. The length of a portion of the positive-electrode lead disposed on the positive-electrode current collector was 57.8 mm, which corresponds to 98% of the width of the current collector (59 mm). Except for these, a cylindrical battery was manufactured in the same manner as in Example 7.

Example 9

The positive-electrode lead was an aluminum lead 4 mm in width, 49.3 mm in length, and 150 μm in thickness. The length of a portion of the positive-electrode lead disposed on the positive-electrode current collector was 35.4 mm, which corresponds to 60% of the width of the current collector (59 mm). Except for these, a cylindrical battery was manufactured in the same manner as in Example 7.

Comparative Example 1

In the same manner as in Example 1, the slurry was applied twice to each surface of the long current collector, four times in total, to form the positive-electrode mixture layer. In the first application step, the positive-electrode mixture slurry was intermittently applied to the first surface of the long current collector except the exposed portion 7 mm in width extending in the width direction of the current collector and except the exposed portion 45 mm in width extending in the longitudinal direction of the current collector, thereby forming the positive-electrode mixture layer 14 mm in width. In the second application step, the positive-electrode mixture slurry was continuously applied to the exposed portion extending in the longitudinal direction of the current collector to form the positive-electrode mixture layer 45 mm in width. The slurry was applied to the second surface of the long current collector in the same manner as in the first surface to form the positive-electrode mixture layers, which overlapped the mixture layer on the first surface in the thickness direction of the electrode plate.

The positive-electrode lead was an aluminum lead 4 mm in width, 25.7 mm in length, and 150 μm in thickness. The length of a portion of the positive-electrode lead disposed on the positive-electrode current collector was 11.8 mm, which corresponds to 20% of the width of the current collector (59 mm) (see FIG. 8). The length of the exposed portion in the width direction of the current collector was 14 mm. In the positive electrode, the exposed portions were entirely covered with a polyimide insulating tape 12 mm in width, 18 mm in length, and 50 μm in thickness. Except for these, a cylindrical battery was manufactured in the same manner as in Example 1.

Comparative Example 2

A positive-electrode mixture layer was formed such that the length of the exposed portion in the width direction of the current collector was 31 mm. The length of a portion of the positive-electrode lead disposed on the positive-electrode current collector was 29.5 mm, which corresponds to 50% of the width of the current collector (59 mm). Except for these, a cylindrical battery was manufactured in the same manner as in Comparative Example 1. The positive-electrode lead was an aluminum lead 4 mm in width, 43.4 mm in length, and 150 μm in thickness.

Comparative Example 3

The length of a portion of the positive-electrode lead disposed on the positive-electrode current collector was 29.5 mm, which corresponds to 50% of the width of the current collector (59 mm). Except for this, a cylindrical battery was manufactured in the same manner as in Example 1. The positive-electrode lead was an aluminum lead 4 mm in width, 49.3 mm in length, and 150 μm in thickness.

Comparative Example 4

The second region of the positive-electrode mixture layer was not formed on each surface of the positive-electrode current collector. An exposed portion extending in the width direction of the current collector was formed over the full width of the electrode plate. Except for these, a cylindrical battery was manufactured in the same manner as in Example 1.

The cylindrical batteries according to the examples and comparative examples were evaluated for positive-electrode winding misalignment and OCV by the following methods.
[Evaluation of Positive-Electrode Winding Misalignment]

An electrode assembly in a battery case was examined using X-rays. A misalignment exceeding a predetermined threshold between positive and negative electrodes was considered to be winding misalignment. The test was performed on 10,000 batteries. The winding misalignment percentage was calculated using the following formula.

Winding misalignment percentage (%)=(Number of
batteries with winding misalignment/10,000)×
100

[Evaluation of OCV]

A charge-discharge cycle including constant-current charging at 0.3C to a battery voltage of 4.1 V and constant-current discharging at 0.3C to 2.5 V was performed three times at 25° C. The battery charged to 4.1 V was then left standing at 45° C. for 1 week. The OCV difference (ΔOCV) was calculated from the OCVs of the battery measured before and after standing. A battery with ΔOCV beyond 3σ from the average value was considered to have poor OCV. The test was performed on 10,000 batteries. The poor OCV percentage was calculated using the following formula.

Poor OCV percentage (%)=(Number of batteries
with poor OCV/10,000)×100

TABLE 1

| | Lead length* (%) | Length of second region in width direction of current collector (mm) | | Winding misalignment percentage (%) | Poor OCV percentage (%) |
|---|---|---|---|---|---|
| | | First surface | Second surface | | |
| Example 1 | 90 | 1 | 1 | 0.12 | 0.02 |
| Example 2 | 98 | 1 | 1 | 0.13 | 0.01 |
| Example 3 | 60 | 1 | 1 | 0.20 | 0.02 |
| Example 4 | 90 | 1 | — | 0.12 | 0.01 |
| Example 5 | 98 | 1 | — | 0.11 | 0.02 |
| Example 6 | 60 | 1 | — | 0.19 | 0.02 |
| Example 7 | 90 | — | 1 | 0.14 | 0.02 |
| Example 8 | 98 | — | 1 | 0.11 | 0.02 |
| Example 9 | 60 | — | 1 | 0.23 | 0.03 |
| Comparative example 1 | 20 | 45 | 45 | 0.72 | 0.02 |
| Comparative example 2 | 50 | 28 | 28 | 0.54 | 0.03 |
| Comparative example 3 | 50 | 1 | 1 | 0.48 | 0.03 |
| Comparative example 4 | 90 | — | — | 0.15 | 0.34 |

*The percentage of the length of a portion of a positive-electrode lead disposed on a positive-electrode current collector relative to the width of the positive-electrode current collector.

Table 1 shows that the winding misalignment percentage of an electrode assembly was lower in the batteries according to Examples 1 to 9 than in the batteries according to Comparative Examples 1 to 3. Thus, winding misalignment of an electrode assembly can be reduced when the length of a portion of a positive-electrode lead disposed on a current collector is 60% or more of the width of the current collector and when the lead is disposed so as not to be unevenly disposed on one end side of the current collector in the width direction.

The poor OCV percentage was lower in the batteries according to Examples 1 to 9 than in the battery according to Comparative Example 4. Thus, a high OCV can be achieved when a mixture layer (a second region) along an exposed portion in the width direction of a current collector is formed in an end portion on the other end side on at least one surface of the current collector in the width direction. The second region can potentially prevent spatters from entering an electrode assembly when a negative-electrode lead is welded to a case main body and thereby achieve high OCV.

REFERENCE SIGNS LIST

10 non-aqueous electrolyte secondary battery, 11 positive electrode, 12 negative electrode, 13 separator, 14 electrode assembly, 15 case main body, 16 seal, 17, 18 insulating plate, 19 positive-electrode lead, 20 negative-electrode lead, 21 protrusion, 22 filter, 23 lower valve body, 24 insulating member, 25 upper valve body, 26 cap, gasket, 30 positive-electrode current collector, 31 one end, 32 the other end, 33A, 33B exposed portion, 35, 35A, 35B positive-electrode mixture layer, 36A, 36B first region, 37A, 37B second region, 38A, 38B insulating tape, 40 long current collector, 43, 44 exposed portion, 45, 46 positive-electrode mixture layer, 50 negative-electrode current collector, 55 negative-electrode mixture layer

The invention claimed is:

1. An electrode for a non-aqueous electrolyte secondary battery, comprising:
    a belt-like current collector;
    a mixture layer formed on each surface of the current collector; and
    a lead bonded to an exposed portion of the current collector where the surfaces of the current collector are exposed, the lead extending from one end of the current collector, the one end and another end constituting both ends of the current collector in a width direction,
    wherein the mixture layer on at least one surface of the current collector is formed in the width direction and adjacent to the exposed portion on the other end side, and
    the length in the width direction of a portion of the lead disposed on the current collector ranges from 60% to 98% of the width of the current collector,
    the electrode for a non-aqueous electrolyte secondary battery, further comprising:
    an insulating tape stuck on the lead,
    wherein the insulating tape is stuck to cover a portion of the mixture layer formed in the width direction and adjacent to the exposed portion on the other end side.

2. The electrode for a non-aqueous electrolyte secondary battery according to claim 1, wherein
    the mixture layer on a first surface of the current collector to which the lead is bonded is formed in the width direction and adjacent to the exposed portion on the other end side.

3. The electrode for a non-aqueous electrolyte secondary battery according to claim 1, wherein
    the mixture layer on a second surface of the current collector to which the lead is not bonded is formed in the width direction and adjacent to the exposed portion on the other end side.

4. The electrode for a non-aqueous electrolyte secondary battery according to claim 1, wherein
    the mixture layer in an end portion on the other end side on at least one surface of the current collector is continuously formed over the entire length of the current collector.

5. The electrode for a non-aqueous electrolyte secondary battery according to claim 1, wherein
    a portion of the mixture layer formed in the width direction and adjacent to the exposed portion on the other end side has a length in the width direction in the range of 0.1% to 40% of the width of the current collector and is formed in the thickness direction of the current collector so as not to overlap the lead.

6. A non-aqueous electrolyte secondary battery comprising:
    a wound electrode assembly manufactured by winding a positive electrode and a negative electrode with a separator interposed therebetween, wherein at least one of the positive electrode and the negative electrode is constituted by the electrode for a non-aqueous electrolyte secondary battery according to claim 1.

7. The non-aqueous electrolyte secondary battery according to claim 6, wherein the positive electrode is constituted by the electrode for a non-aqueous electrolyte secondary battery, and the exposed portion is formed in a central portion of the positive electrode in a longitudinal direction.

* * * * *